Jan. 3, 1939.  P. E. KÖSTER  2,142,516

NAVIGATING INSTRUMENT FOR AIRCRAFT

Filed Jan. 23, 1937

Inventor
Paul Eduard Köster
by Knight Bros.
Attorneys

Patented Jan. 3, 1939

2,142,516

UNITED STATES PATENT OFFICE 2,142,516

NAVIGATING INSTRUMENT FOR AIRCRAFT

Paul Eduard Köster, Berlin-Siemennsstadt, Germany, assignor to Siemens Apparate und Maschinen Gesellschaft mit beschränkter Haftung, Berlin, Germany, a corporation of Germany Application January 23, 1937, Serial No. 122,072
In Germany January 24, 1936

3 Claims. (Cl. 33—204)

My invention relates to improvements in navigating instruments for aircraft and more particularly for airplanes.

In aircraft navigation, the turning speed of a craft is determined by means of a spring-biased gyro, generally known as a turn indicator. It is further necessary, particularly for blind flying, to know the longitudinal inclination and the bank of the airplane.

The object of my invention is to provide an arrangement of instruments for measuring the above-mentioned magnitudes, whereby a simultaneous reading off of the magnitudes to be measured may be easily effected. This object is accomplished according to the invention by a particular combination of a turn indicator, a pitch indicator and a bank indicator so as to form a single apparatus which enables reading the magnitudes measured by the three measuring mechanisms within the same range of vision.

Figure 1:
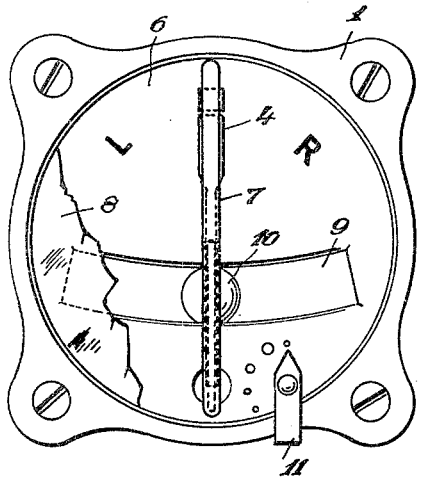
Figure 2:
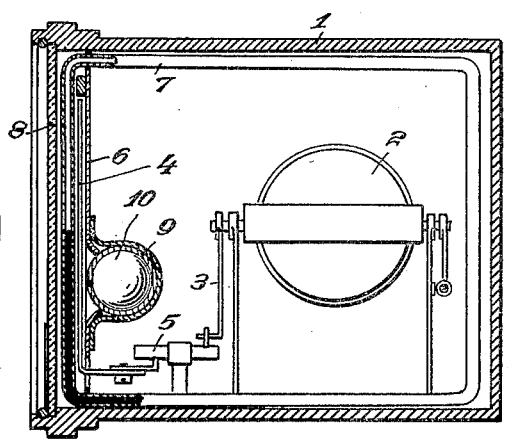
Figure 3:
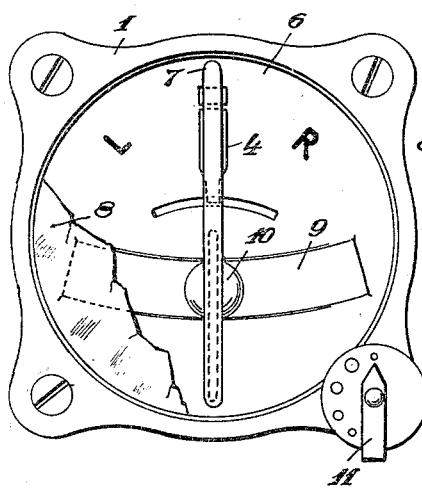
Figure 4:
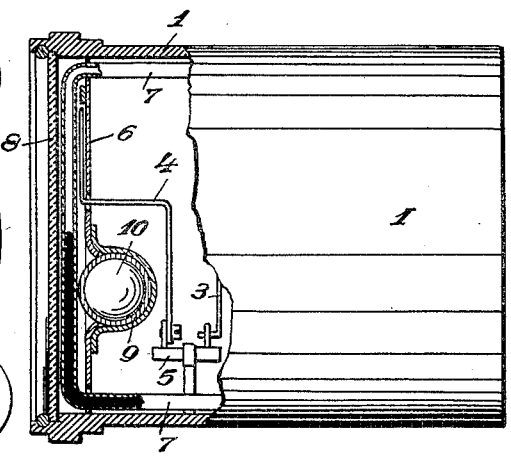

Details of the invention will be apparent from the following description taken in connection with the accompanying drawing in which similar numerals of reference refer to similar parts in all views and in which Figs. 1 and 2 show a front view and a longitudinal sectional view of an embodiment of my invention and Figs. 3 and 4 show similar views of a modified form of my invention.

In Figs. 1 and 2, 1 denotes a pot-like casing within which the three measuring mechanisms are placed. 2 is a gyro turn indicator, schematically shown. The turns of the airplane measured by the turn indicator are transmitted to a pointer 4 through a lever 3. The pointer 4 is rotatably mounted as indicated at 5 and moves over a circular scale 6. A pitch indicator of the liquid-in-pipe type containing, for instance, colored alcohol surrounds the chamber for the reception of the inclinometer and extends therethrough. The indicating portion of the pitch indicator extends through the space between the circular scale 6 and a common window 8 and is in registry with the pointer 4 of the turn indicator in the zero position thereof. The window 8 also forms a cover for the casing 1. The bank indicator is of the ball-in-curved-tube type, i. e. it consists of a level 9 containing a movable ball 10 as indicating element. The level 9 is arranged transversely to the measuring limb of the pitch indicator 7 and behind the latter in such a manner that the pointer 4 of the turn indicator may move between both inclinometers. 11 is a step switch placed on the front plate of the apparatus and is provided for switching in and out the turn indicator as well as for controlling the speed thereof.

Figs. 3 and 4 show substantially the same arrangement as that shown in Figs. 1 and 2. The second form of the apparatus according to the invention differs from the first form only in the arrangement of the pointer 4. It has been found that a great parallax, particularly when viewing the apparatus from the side is brought about by the distance between the two inclinometers which is necessary for the pointer. This may cause inaccurate readings. To remove this drawback, the pointer 4 is, therefore, bent over the bank indicator 9 in the manner shown in Fig. 4. In this way, it is possible to arrange the bank indicator 9 directly behind the indicating portion of the pitch indicator 7 and to cause the free indicating end of the pointer 4 to oscillate directly behind this portion of the pitch indicator.

A further advantage of the second form of the invention lies in a saving of space so that the dimensions of the entire apparatus may be made smaller, which is particularly essential to airplanes.

The compact construction of the apparatus presents the further advantage in that the cross-section of the indicating portion of the pitch indicator is reduced compared to the circular cross-section in the direction of the longitudinal axis and increased in the direction of the transverse axis.

I claim as my invention:

1. In a navigating instrument for aircraft, combining in a common pot-like casing with a common field of indication a gyroscopic turn indicator, a bank indicator and a pitch indicator, said turn indicator having a normally vertical, rotatable indicating pointer, said pitch indicator being of the liquid-in-pipe type and having its pipe arranged within said common casing so as to surround the gyroscope of said turn indicator, the indicating portion of said pipe being arranged transverse to the opening of said pot-like casing so as to cover said pointer when said pointer is in its zero position, and said bank indicator being of the ball-in-curved-tube type and being arranged in proximity and transversely to said pointer and said indicating portion so as to have its indicator located behind said portion.

2. In an aircraft navigating instrument combining a gyroscopic turn indicator, a bank indicator and a pitch indicator so as to have a common casing and a common dial, said gyroscopic turn indicator having an indicating pointer rotatable before said dial and vertical in zero position, said pitch indicator being of the liquid-in-pipe type and having its indicating portion arranged parallel to the zero position of said pointer so as to cover said pointer when said pointer is in zero position, and said bank indicator consisting of the ball-in-curved-tube type and being arranged transversely to said portion so as to have its indicator when in zero position also lying behind said indicating portion, said portion being flattened in cross section with its greater dimension transverse.

3. In an aircraft navigating instrument combining a gyroscopic turn indicator, a pitch indicator and a bank indicator in a common casing so as to have a common field of indication, said pitch indicator being of the liquid-in-pipe type and having its indicating portion arranged so as to indicate the zero positions of said bank indicator and said turn indicator, said bank indicator consisting of the ball-in-curved-tube type and being arranged parallel to and in proximity with said portion, said turn indicator having an indicating pointer rotatably mounted on a pivot behind said bank indicator with respect to said portion, said pointer being bent around said bank indicator and having its indicating end arranged closely behind said portion.

PAUL EDUARD KÖSTER.